United States Patent [19]

Kawamura

[11] Patent Number: 4,964,625
[45] Date of Patent: Oct. 23, 1990

[54] HYDRAULIC DAMPER WITH OIL LOCK MECHANISM

[75] Inventor: Sadao Kawamura, Hamamatsu, Japan

[73] Assignee: Kabushiki Kaisha Showa Seisakusho, Tokyo, Japan

[21] Appl. No.: 218,085

[22] Filed: Jul. 12, 1988

[30] Foreign Application Priority Data

Jul. 14, 1987 [JP] Japan .................. 62-176606

[51] Int. Cl.⁵ .............. F10F 5/00; F16F 1/48
[52] U.S. Cl. ................. 267/221; 267/64.12; 267/64.15; 188/284; 188/288; 188/300; 188/322.19; 280/276
[58] Field of Search ............... 188/284, 288, 300, 315, 188/322.17, 322.19; 267/217, 221, 226, 64.12, 64.26, 64.15; 280/668, 276

[56] References Cited

U.S. PATENT DOCUMENTS

| | | | |
|---|---|---|---|
| 1,234,311 | 7/1917 | Duncay | 267/64.15 |
| 2,819,893 | 1/1958 | Edwards | 267/221 |
| 4,345,748 | 8/1982 | Wossner et al. | 267/64.15 X |
| 4,367,882 | 1/1983 | Alexander et al. | 280/276 |
| 4,424,980 | 1/1984 | Tsukamoto et al. | 280/276 |
| 4,561,669 | 12/1985 | Simons | 280/276 |

Primary Examiner—Andres Kashnikow
Assistant Examiner—Richard Potosnak
Attorney, Agent, or Firm—Rosen, Dainow & Jacobs

[57] ABSTRACT

A hydraulic damper has an oil lock mechanism for preventing bottoming when the hydraulic damper is fully compressed. The hydraulic damper also includes an outer tube, an inner tube, a cylinder movable with the inner tube, a piston rod movable with the outer tube, a piston fixed to a distal end of the piston rod, and a coil spring disposed in the inner tube. The oil lock mechanism comprises an oil lock piece mounted on an upper end of the cylinder, and an oil lock tube disposed concentrically between the cylinder and the inner tube and having a larger-diameter portion which can be spaced from the oil lock piece when the hydraulic damper is extended and a smaller-diameter portion which can be held in sliding contact with the oil lock piece when the hydraulic damper is compressed.

5 Claims, 2 Drawing Sheets

HYDRAULIC DAMPER WITH OIL LOCK MECHANISM

BACKGROUND OF THE INVENTION

1. Field of the Invention

The present invention relates to a hydraulic damper for use in a front fork for a motorcycle, and more particularly to a vertical hydraulic damper having an oil lock mechanism.

2. Description of the Relevant Art

Various hydraulic dampers for use in front forks for motorcycles are known. For example, U.S. Pat. No. 4,561,669 discloses a vertical hydraulic damper including an outer tube having an upper end closed by a fork cap and coupled to a motorcycle frame by means of a pair of upper and lower brackets. An inner tube is slidably inserted, from below, into the outer tube and has a lower end closed by a clamp member by which a wheel axle is rotatably supported. A cylinder or damper piston tube disposed concentrically within the inner tube has a lower end fixed to the axle clamp member for movement with the inner tube. A piston rod having an upper end attached to the fork cap extends in the cylinder and has a lower end on which there is mounted a piston held in sliding contact with the inner peripheral surface of the cylinder.

The disclosed hydraulic damper also includes an oil lock piston disposed on the upper end of the piston damper rod and projecting downwardly, and an oil lock cylinder mounted on a guide bushing fixed to the upper end of the cylinder and slidably fitted over the piston rod. When the hydraulic damper is compressed a maximum stroke, the oil lock piston is fitted into the oil lock cylinder to entrap working oil in the oil lock cylinder for locking oil to prevent bottoming of the hydraulic damper.

Since the oil lock mechanism is positioned on the upper end of the vertical hydraulic damper, the oil lock cylinder at the upper end of the cylinder must be filled with working oil at all times in order for the oil lock mechanism to operate reliably without fail. Since, however, a gas is filled in an upper portion of the damper, the oil lock cylinder may not be filled with a sufficient amount of working oil, causing the oil lock mechanism to malfunction or initiating oil locking operation at irregular positions. The oil lock cylinder has an oil lock chamber which has a small pressure-bearing area because a oil spring is disposed around the cylinder. Inasmuch as oil is not locked until a high pressure buildup is developed in the oil lock chamber, therefore, it is necessary to minimize the gap or clearance between the oil lock piston and the oil lock cylinder. At times, the oil lock piston and the oil lock cylinder may be brought into contact with each other, thus producing metal particles due to wear. The metal particles thus produced tend to damage the sealing capability between the cylinder and the piston for generating damping forces. As a result, the generated damping forces are liable to become unstable.

SUMMARY OF THE INVENTION

It is an object of the present invention to provide a hydraulic damper having an oil lock mechanism which includes an oil lock chamber with an increased pressurebearing area and is capable of locking oil in the oil lock chamber reliably without fail.

According to the present invention, there is provided a hydraulic damper comprising: an outer tube having a closed upper end and adapted to be coupled to a vehicle frame; an inner tube having a closed lower end and slidably inserted in the upper tube; a cylinder coaxially disposed in the inner tube and movable with the inner tube; a piston rod inserted in the cylinder and movable with the outer tube; a piston fixed to a distal end of the piston rod and held in sliding contact with an inner peripheral surface of the cylinder; a coil spring disposed in the inner tube; and an oil lock mechanism for preventing bottoming when the hydraulic damper is fully compressed, the oil lock mechanism comprising an oil lock piece mounted on an upper end of the cylinder, and an oil lock tube disposed concentrically between the cylinder and the inner tube and having a larger-diameter portion which can be spaced from the oil lock piece when the hydraulic damper is extended and a smaller-diameter portion which can be held in sliding contact with the oil lock piece when the hydraulic damper is compressed.

When the damper is compressed to move the piston downwardly with respect to the cylinder, a check valve disposed around the upper end of the cylinder is fitted into the smaller-diameter portion of the oil lock tube comprising a spring collar, thereby locking working oil in an annular oil chamber defined between the inner peripheral surface of the inner tube and the outer peripheral surface of the cylinder. The annular oil chamber serving as an oil lock chamber has a large pressure-bearing area, and the oil lock mechanism is positioned in the surface level of the working oil in the damper, so that the working coil can be locked reliably without fail.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
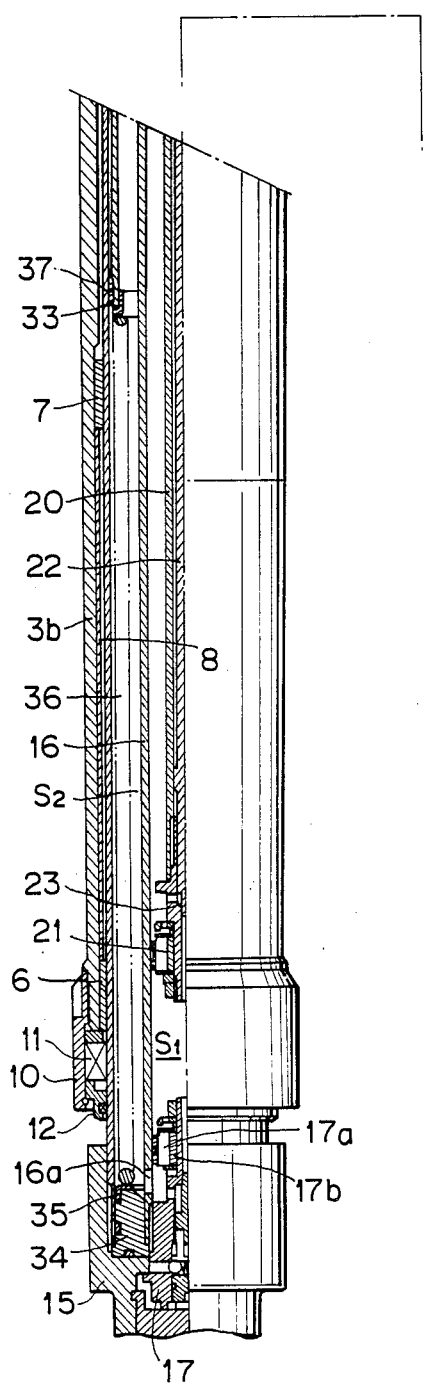
FIG. 1 is a longitudinal cross-sectional view of a hydraulic damper, compressed a maximum stroke, having an oil lock mechanism according to the present invention.
Figure 1:
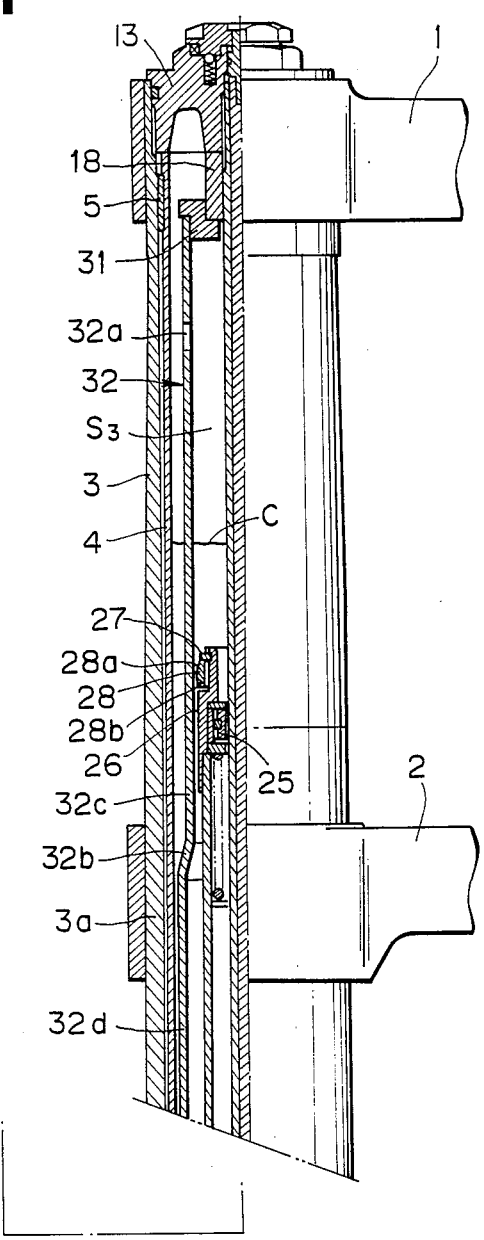
Figure 2:
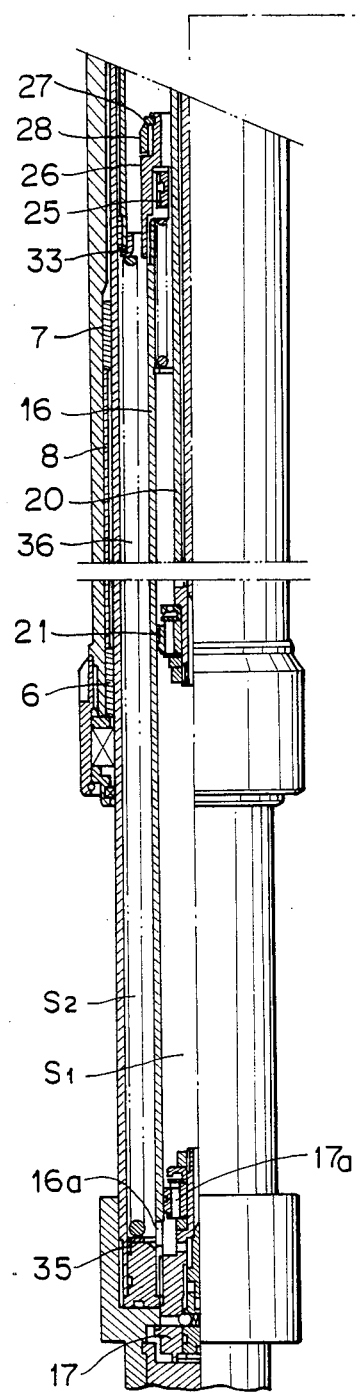
FIG. 2 is a longitudinal cross-sectional view of the hydraulic damper of FIG. 1 as it is extended.
Figure 2:
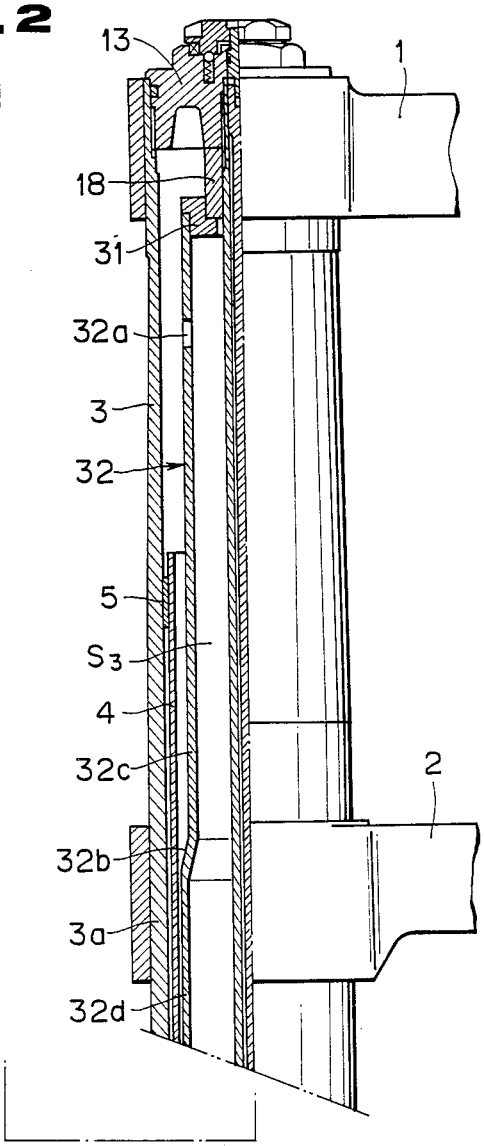

As shown in FIGS. 1 and 2, a hydraulic damper according to the present invention includes an outer tube 3 coupled at upper end and intermediate portions thereof to a motorcycle frame by means of upper and lower brackets 1, 2. The outer tube 3 has an upper end closed by a fork cap 13 and a lower end on which there is mounted a holder 10 retaining an oil seal 11 and a dust seal 12 that are held in sliding contact with the outer peripheral surface of an inner tube 4.

The inner tube 4 is slidably inserted in the outer tube 3 from below and has a lower end threaded in and closed by an axle clamp member 15. A slide bushing 5 is fitted over the upper end of the inner tube 4 in sliding contact with the inner peripheral surface of a smaller-diameter upper portion 3a of the outer tube 3. Slide bushings 6, 7 are slidably fitted respectively against the inner peripheral surface of a lower end of a larger-diameter lower portion 3b of the outer tube and the inner peripheral surface of an upper end of the larger-diameter lower portion 3b near the smaller-diameter upper portion 3a. A collar 8 is disposed between the slide bushings 6, 7 to retain the slide bushings 6, 7 in position.

A cylinder 16 is coaxially disposed in the inner tube 4 and has a lower end fixed to the axle clamp member 15 by means of a central bolt 17 and a holder 34. A hollow rod 20 is inserted in the cylinder 16 from above and has an upper end fastened to the fork cap 13 by a locknut 18. A piston 21 is mounted on the lower end of the hollow rod 20 in sliding contact with the inner peripheral surface of the cylinder 16. In the hollow rod 20, there is inserted a damping force adjusting rod 22 having a damping force adjusting needle 23 on its lower end. The cylinder 16 has an oil hole 16a defined in the lower end thereof and providing fluid communication between the interior and exterior spaces of the cylinder 16. A bottom piece 17b attached to the central bolt 17 also has an oil hole 17a.

Figure 3:
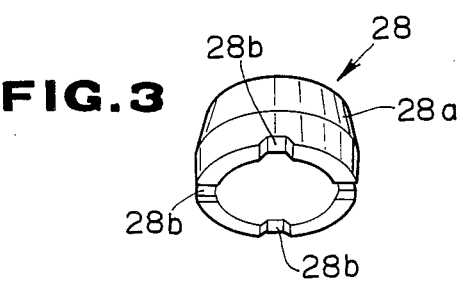
FIG. 3 is a perspective view of a check valve in the hydraulic damper.

A rod guide 25 and an oil lock piece 26 held in sliding contact with the outer peripheral surface of the hollow rod 20 are mounted on the upper end of the cylinder 16. A washer 27 serving as a valve seat is secured to the upper end of the oil lock piece 26 by staking. A check valve 28 is disposed around the oil lock piece 26 below the washer 27 with a prescribed clearance between the check valve 28 and the oil lock piece 26. As shown in FIG. 3, the check valve 28 is of an annular shape having a tapered outer peripheral surface 28a which is progressively tapered upwardly. The check valve 28 has a plurality of radial recesses 28b defined in the bottom surface thereof at circumferentially spaced intervals.

A spring collar holder 31 is fitted over the lower end of the lock nut 18 secured to the fork cap 13. A spring collar 32 has an upper end fitted over the lower end of the spring collar holder 31, the spring collar 32 depending between the inner tube 4 and the cylinder 16. A spring seat 33 is fitted in the lower end of the spring collar 32, and a spring seat 35 is placed on the upper surface of the holder 34 fitted in the lower end of the inner tube 4. A coil spring 36 is interposed axially between the spring seats 33, 35.

The spring collar 32 has an intermediate portion positioned substantially centrally in the smaller-diameter portion 3a of the outer tube 3. The intermediate portion of the spring collar 32 has an upwardly tapered portion 32b for progressively increasing an oil locking load. The spring collar 32 includes a smaller-diameter portion 32c extending upwardly of the tapered portion 32b and a larger-diameter portion 32d extending downwardly of the tapered portion 32b. When the damper is compressed a maximum stroke, the outer peripheral surface of the check valve 28 is held against the inner peripheral surface of the smaller-diameter portion 32c of the spring collar 32. The spring collar 32 has an oil hole 32a defined therein near its upper end to provide fluid communication between the interior and exterior spaces of the spring collar 32. A slide bushing 37 held in sliding contact with the inner peripheral surface of the inner tube 4 is fitted over the lower end of the spring collar 32.

The hydraulic damper is filled with working oil up to a level indicated by the line C, with a gas filled in a space above the surface level C.

Operation of the hydraulic damper will be described below.

When the hydraulic damper switches from an extended position of FIG. 2 to a compressed position, the hollow rod 20 and the spring collar 32 are lowered with the outer tube 3 with respect to the inner tube 4 and the cylinder 16, thus compressing working oil in a lower hydraulic chamber $S_1$ defined in the cylinder 16 below the piston 21. The working oil in the lower hydraulic chamber $S_1$ is forced to flow through the oil hole 17a of the bottom piece 17b and the lower oil hole 16a of the cylinder 16 into an annular oil chamber $S_2$ defined between the inner peripheral surface of the inner tube 4 and the outer peripheral surface of the cylinder 16, and then tends to flow toward an upper oil chamber $S_3$ defined in the spring collar 32 above the check valve 28. Since the check valve 28 is positioned in the larger-diameter portion 32d of the spring collar 32 at this time, the working oil flows between the outer peripheral surface of the check valve 28 and the inner peripheral surface of the spring collar 32 into the oil chamber $S_3$.

Upon continued downward movement of the outer tube 4 and the hollow rod 20 to a position near the completely compressed position shown in FIG. 1, the check valve 28 on the upper end of the cylinder 26 moves into the tapered portion 32b of the spring collar 32, making the gap between the check valve 28 and the spring collar 32 progressively smaller. At this time, the working oil can still flow from the annular oil chamber $S_2$ into the oil chamber $S_3$ through the progressively decreasing gap.

When the fully compressed position of FIG. 1 is reached, the outer peripheral surface of the check valve 28 is held in sliding contact with the inner peripheral surface of the smaller-diameter portion, or oil lock tube, 32c of the spring collar 32. The oil pressure in the annular oil chamber $S_2$ then becomes higher than the oil pressure in the oil chamber $S_3$, thus forcing the check valve 28 against the washer 27. The working oil is now prevented by the check valve 28 from flowing from the annular oil chamber $S_2$ into the oil chamber $S_3$, but is confined in the annular oil chamber $S_2$ under an oil locked condition. Thus, the working oil is locked in the annular oil chamber $S_2$ while producing damping forces due to the pressure difference between the annular oil chamber $S_2$ and the oil chamber $S_3$.

The annular oil chamber $S_2$ defined between the inner peripheral surface of the inner tube 4 and the outer peripheral surface of the cylinder 16 thus serves as oil locking chamber which has a greater pressure-bearing area than that of the conventional hydraulic damper. Since the pressure difference between the chambers $S_2$, $S_3$ may therefore be reduced, the dimensional accuracy of the parts used may be lower.

When the hydraulic damper is then shifted from the compressed position to the extended position, the outer tube 3 and the piston rod 20 are moved upwardly with respect to the inner tube 4 and the cylinder 16, and so is the piston 21. The working oil in the annular oil chamber $S_2$ flows through the hole holes 16a, 17a into the oil chamber $S_1$, and the inner tube 4 is retracted downwardly. Therefore, the oil pressure in the annular oil chamber $S_2$ is reduced for thereby moving the check valve 28 downwardly against an annular step of the oil lock piece 26, whereupon the check valve 28 is opened.

The working oil in the oil chamber $S_3$ then flows through an oil passage between the upper end of the check valve 28 and the washer 27, an annular oil passage between the check valve 28 and the oil lock piece 26, and the recesses 28b of the check valve 28 into the annular oil chamber $S_2$, so that the piston 21 can smoothly be moved upwardly.

In the above embodiment, the spring collar 32 is employed as the oil lock tube. However, the present invention is not limited to such a construction, but is also applicable to an arrangement in which an oil lock tube separate from the spring collar depends from a fork bolt.

With the present invention, as described above, the annular oil chamber $S_2$ defined between the inner peripheral surface of the inner tube 4 and the outer peripheral surface of the cylinder 16 is used as the oil lock chamber. Therefore, the pressure-bearing area of the oil lock chamber is large when locking the working oil in the oil lock chamber. Since the oil lock mechanism is positioned below the surface level of the working oil, the working oil can be locked reliably without fail.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. An hydraulic damper comprising:
   an outer tube having a closed upper end and adapted to be coupled to a vehicle frame;
   an inner tube having a closed lower end and slidably inserted in said outer tube;
   a cylinder coaxially disposed in said inner tube and movable with the inner tube;
   a piston rod inserted in said cylinder and movable with said outer tube;
   a piston fixed to a distal end of said piston rod an held in sliding contact with an inner peripheral surface of said cylinder;
   a coil spring disposed in said inner tube; and
   an oil lock mechanism for preventing bottoming when the hydraulic damper is fully compressed, said oil lock mechanism comprising an oil lock piece mounted on an upper end of said cylinder, and an oil lock tube disposed concentrically between said cylinder and said inner tube and having a larger-diameter portion radially spaced from said oil lock piece when the hydraulic damper is extended and a smaller-diameter portion in sliding contact with an outer peripheral surface of said oil lock piece for substantially preventing the flow of working oil when the hydraulic damper is compressed.

2. A hydraulic damper according to claim 1, wherein said oil lock tube comprises a spring collar disposed between an upper end of said coil spring and said closed upper end of said outer tube.

3. An hydraulic damper according to claim 1, wherein said oil lock tube further includes a portion having a diameter progressively smaller upwardly and interconnecting said larger- and smaller-diameter portions of the oil lock tube.

4. A hydraulic damper according to claim 1, wherein said oil lock piece has a check valve which can be closed when the hydraulic damper is compressed and opened when the hydraulic damper is extended, said check valve being fittable in said smaller-diameter portion of said oil lock tube.

5. A hydraulic damper according to claim 4, wherein said check valve has a tapered outer peripheral surface on an upper portion thereof, said tapered outer peripheral surface being tapered upwardly.

* * * * *